UNITED STATES PATENT OFFICE.

JAMES H. IRWIN, OF NEW YORK, N. Y.

IMPROVEMENT IN PROCESSES FOR PREPARING AND CANNING MACARONI.

Specification forming part of Letters Patent No. 222,404, dated December 9, 1879; application filed October 29, 1879.

*To all whom it may concern:*

Be it known that I, JAMES H. IRWIN, of the city, county, and State of New York, have invented a new and useful compound composed largely of baked macaroni, put up in air-tight cans in such a manner that it will remain fresh and good, as fully set forth in the following specification.

Put one pound of macaroni, broken into lengths not less than seven inches, into a mixture made of one gallon of water, two ounces of salt, and one-half pint of port-wine, and boil twenty minutes, until the macaroni is properly swollen, but not broken. The object of the salt and wine and boiling, &c., is to flavor and as a preservative.

The preparation is now in condition to commence process of baking and canning. Take three pounds of macaroni, swollen by process as before stated, and place it in a can. After placing in cans, three pounds in each can, pour into each canful of macaroni, as stated, about one gill to each pound of macaroni of a preparation composed of the following ingredients, and in the following proportions: tomatoes, previously boiled and strained to the consistency of jelly, twenty-five per cent.; beef-stock, sixty-five per cent.; ten per cent. onions, previously boiled and strained to the consistency of jelly. Then add butter in the proportion of four ounces to three pounds of macaroni; then cover the whole contents of can with about one-fourth pound best Parmesan cheese; then moisten thoroughly with water; then place cans in an oven, into which steam is injected until contents, as hereinbefore prepared, are thoroughly browned; take out of oven, spread contents with about two-thirds of a table-spoonful of browned flour (as coloring-matter) to each pound of preparation. When cool, solder up; then place the cans in a suitable pan in a steam-bath of at least 200° Fahrenheit; let them so remain about twenty minutes.

It is intended to place the macaroni in cans containing three pounds of macaroni, in addition to the other ingredients, and the directions above given are with a view to that quantity; but the macaroni can be canned in any other sized can, the quantity of materials to be varied according to the size of the can.

I claim as my invention—

1. The process of preparing macaroni for canning by boiling the macaroni in water, salt, and wine until swollen or partially cooked and unbroken.

2. The process of baking and canning macaroni, prepared as above stated, in cases with jelly of tomatoes and beef-stock, moistening, and covering with cheese, then cooking same by external steam-heat, and subsequently closing the cases and further subjecting them to a steam-heat of at least 200° Fahrenheit, substantially as set forth.

JAMES H. IRWIN.

Witnesses:
FRANCIS C. DEVLIN,
JOHN T. McDONOUGH.